(No Model.)
W. A. SHAW.
SELF SUSTAINING ELECTRIC BATTERY.
No. 305,022. Patented Sept. 9, 1884.
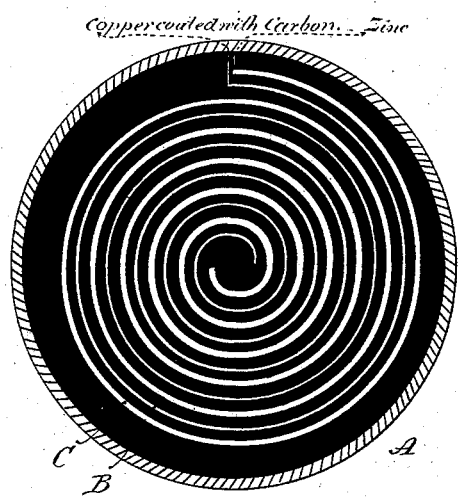
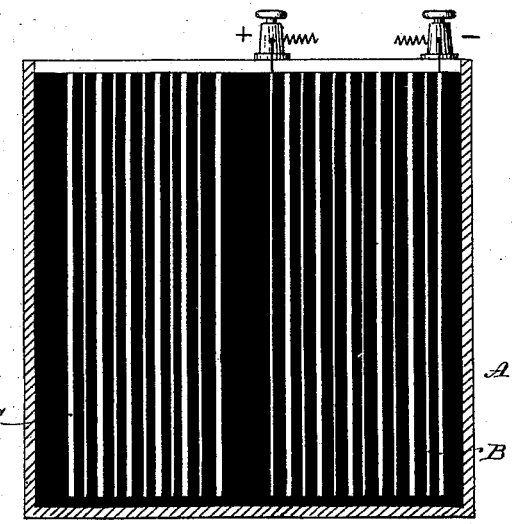
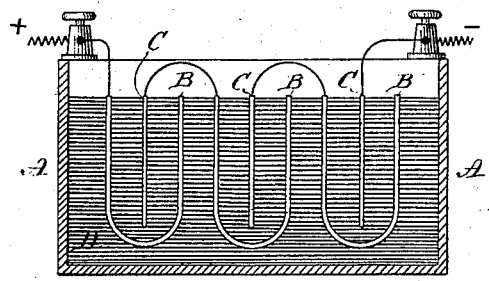
WITNESSES
INVENTOR
William Anthony Shaw
By his Attorney

UNITED STATES PATENT OFFICE.

WM. ANTHONY SHAW, OF BROOKLYN, ASSIGNOR OF ONE-HALF TO LEBBEUS H. ROGERS, OF NEW YORK, N. Y.

SELF-SUSTAINING ELECTRIC BATTERY.

SPECIFICATION forming part of Letters Patent No. 305,022, dated September 9, 1884.

Application filed March 24, 1882. (No model.)

*To all whom it may concern:*

Be it known that I, WILLIAM ANTHONY SHAW, of Brooklyn, in the county of Kings and State of New York, have invented a new and useful Improvement in Electric Batteries, of which the following is a specification.

This invention has for its object to produce a battery of large and constant electro-motive force, and to render polarization in batteries extremely slow, if not to obviate it entirely.

In the improved battery electrodes are preferably zinc and sheet-copper, the latter well coated with a thick paste of lamp-black or other carbon-powder, with sulphuric acid and water. A little alcohol added improves the mixture. The lamp-black or other carbon may be mixed with dilute sulphuric acid, (one part acid to ten parts water;) or it can be digested in ten times its weight of sulphuric acid at 66° Baumé for twenty-four hours, and washed, and then made into a paste with water. These electrodes are placed in cells containing, by preference, an excitant or electrolyte of nitrate potassa and earth, mixed thoroughly together in about equal proportions. Some nitrate of soda mingled with the earth and nitrate of potassa will be advantageous on account of its deliquescent properties. The zinc electrodes can be amalgamated or not, as may be desired; but they work rather better for being amalgamated. The nitrate of potassa, by reason of its combination with the earth, is to a large extent renewed from the atmosphere, thus avoiding a great part of the expense incurred in other batteries for acids and solutions, and at the same time maintaining the electro-motive force of the battery, which is in other cases weakened by the loss of acids from their solutions. The deposit of gases upon the carbon or zinc electrodes is prevented by their absorption by the earth. From these causes is due the constancy of the battery. Where an increased electro-motive force is desired and constancy is not so much an object, the electrolytic mixtures can be moistened occasionally with dilute acids, as sulphuric, or with solutions of salt in water, or simply with water alone. A mixture of chloride of sodium and pulverized alum dissolved in water affords very good results.

In the accompanying drawings, which form a part of this specification, Figures 1 and 2 are a cross-section and vertical section, respectively, of a battery or cell constructed in accordance with this invention; and Fig. 3, a vertical longitudinal section of a battery having a number of pairs or elements inclosed in one case.

A is the inclosing vessel or case; B, the electrodes of copper coated with a mixture of lampblack and sulphuric acid, and C the electrode of zinc. As shown in Figs. 1 and 2, the two electrodes are wound into volutes, which are interleaved, and the whole is embedded in the mixture of nitrates of soda and potassa and earth. (Shown in black.) In Fig. 3 there are three U-shaped carbon-coated copper electrodes and three zinc electrodes, inclosed one in each of the U-shaped electrodes, the whole being embedded in the electrolyte mixture, which is represented by parallel lines, and the several pairs of electrodes being connected in series.

The improved battery can be worked uninterruptedly for long periods, maintaining its electro-motive force to a remarkable degree. It is especially available for electro-plating, telegraphs, telephones, electric bells, &c., and for charging storage or secondary batteries.

The cost of the materials is small. There are no acids to be spilled about, nor fumes to be given off into the air. The battery can be used in cold climates without danger of freezing, and can be worked for a long time without any care or attention.

It is obvious that modifications may be made in details without departing from the spirit of the invention, and that parts of the invention can be used separately. For example, the paste of lamp-black and sulphuric acid and water can be supplied to metal other than copper, or to non-metallic conducting material—carbon, for instance. Carbon powder can be made into a paste with other battery-fluid as well as with sulphuric acid. The carbon-coated electrodes can be used in place of the copper or carbon electrode in the ordinary galvanic batteries. Nitrates or other salts can be mixed in the lamp-black paste.

The invention is designed for primary electric batteries, but is, in part at least, applicable to secondary or polarization batteries or accumulators.

I am aware that heretofore it has been proposed to make battery-plates by depositing carbon from hydrocarbon gas in a heated retort upon metal plates, leaving one end exposed, for establishing the connection with the exterior circuit; also, to embed battery-plates in a mixture of sand or similar material and crystallized calcium chloride, and also to place a mixture of nitrate of potash and sulphate of copper around the negative element or positive electrode. These several matters are not included within the present invention.

Having now described my said invention, what I claim, and desire to secure by Letters Patent, is—

1. An electrode of metal coated with lampblack, substantially as described.

2. An electrode having a coherent or self-sustaining coating formed by a paste of lampblack or other carbonaceous powder and sulphuric acid or other battery-fluid, substantially as described.

3. A galvanic cell comprising electrodes of opposite polarity embedded in a mixture of one or more nitrates and absorbent material, such as earth, substantially as described.

4. The combination of the carbon-coated metal electrode and the opposing electrode with the electrolyte or excitant formed of a mixture of solid salt or salts and absorbent medium, substantially as described.

In testimony whereof I have signed this specification in the presence of two subscribing witnesses.

WM. ANTHONY SHAW.

Witnesses:
M. M. BUDLONG,
G. W. RAWSON.